United States Patent

Harazoe et al.

[11] Patent Number: 5,573,820
[45] Date of Patent: Nov. 12, 1996

[54] PROCESS FOR PREPARING POLYESTER

[75] Inventors: Hirofumi Harazoe, Kuga-gun; Masayuki Sakai, Ichihara, both of Japan

[73] Assignee: Mitsui Petrochemical Industries, Ltd., Tokyo, Japan

[21] Appl. No.: 364,092

[22] Filed: Dec. 27, 1994

[30] Foreign Application Priority Data

Dec. 28, 1993 [JP] Japan .................................. 5-338681
Dec. 28, 1993 [JP] Japan .................................. 5-338682

[51] Int. Cl.$^6$ .............................. B32B 1/08; C08G 63/18
[52] U.S. Cl. ...................... 428/35.7; 528/272; 528/274; 528/308.2; 528/308.4; 528/308.5; 528/489; 528/499; 528/502 R; 528/503
[58] Field of Search ............................. 528/308.2, 308.4, 528/308.5, 489, 499, 502, 503, 272, 274; 428/35.7

[56] References Cited

U.S. PATENT DOCUMENTS

| | | | |
|---|---|---|---|
| 4,609,721 | 9/1986 | Kirshenbaum et al. | 528/285 |
| 5,241,046 | 8/1993 | Shiraki et al. | 528/502 |
| 5,270,444 | 12/1993 | Shiraki et al. | 528/499 |
| 5,292,865 | 3/1994 | Kerpes et al. | 528/492 |

*Primary Examiner*—Samuel A. Acquah
*Attorney, Agent, or Firm*—Sherman and Shalloway

[57] ABSTRACT

The invention provides a process for preparing a polyester comprising a liquid phase polycondensation step in which a dicarboxylic acid including terephthalic acid or its ester derivative and a diol including ethylene glycol or its ester derivative are subjected to polycondensation reaction in liquid phase and molten state under heating in the presence of a polycondensation catalyst to produce a polyester (a) having an intrinsic viscosity, as measured in o-chlorophenol, of 0.7 to 1.5 dl/g; a hot water treatment step in which the polyester (a) is contacted with hot water of 60° to 130° C. for 30 minutes to 10 hours; a drying step in which the polyester after the hot water treatment step is dried at a temperature of 110° to 150° C. for 30 minutes to 6 hours; and a heat treatment step in which the polyester after the drying treatment step is heated at a temperature of 160° to 200° C. for 1 to 10 hours; wherein the finally obtained polyester has an acetaldehyde content of not more than 10 ppm. The polyester (a) obtained in the step can be precrystallized in a precrystallization step by keeping it in an atmosphere of a heat-up crystallization temperature $(T_{c1})$ to 200° C. for 1 minute to 4 hours, prior to the drying step and the heat treatment step. Further, when the precrystallization step is carried out, the polyester obtained in the step can also be subjected to the heat treatment step and then the hot water treatment step.

The process of the invention has advantages that a solid phase polycondensation step can be omitted, and the process can provide a polyester having a low acetaldehyde content as well as reduced tendency to increase acetaldehyde during the molding process. Thus the polyester obtained by the process of the invention is particularly suited as a material for preform and beverage bottles formed from the preform. These bottles do not alter the tastes of the contents therein.

24 Claims, 3 Drawing Sheets

Fig. 1

[A] Liquid phase polycondensation step
Polycondensation in liquid phase between diol and dicarboxylic acid
  [A-1] Esterification reaction step
  ↓
  [A-2] Polycondensation reaction step
To obtain polyester (a)

[B] Precrystallization step
  $Tc_1 \sim 200°C$
To obtain polyester (b)

[C] Hot water treatment step
  hot water of $60 \sim 130°C$
To obtain polyester (c-1)

[D-1] Low-temperature drying step
  $110 \sim 150°C$

[D-2] Heat Treatment step
  $160 \sim 200°C$

Polyester (d-1)

acetaldehyde content ≦ 10ppm

Fig. 2

[A] Liquid phase polycondensation step
Polycondensation in liquid phase
between diol and dicarboxylic acid
  [A-1] Esterification reaction step
          ↓
  [A-2] Polycondensation reaction step
To obtain polyester (a)

[B] Precrystallization step
    $Tc_1 \sim 200°C$
To obtain polyester (b)

[D-2] Heat Treatment step
      $160 \sim 200°C$
To obtain polyester (d-2)

[C] Hot water treatment step
    $60 \sim 130°C$

Polyester (d-2)
 (i) intrinsic viscosity = $0.7 \sim 1.5 dl/g$
 (ii) acetaldehyde content $\leq$ 10ppm

PROCESS FOR PREPARING POLYESTER

FIELD OF THE INVENTION

The present invention relates to a process for preparing a polyester, and more particularly to a process which is capable of providing a polyester having a low acetaldehyde content and hardly causing increase in acetaldehyde during molding thereof by means of simplified steps.

BACKGROUND OF THE INVENTION

Bottles obtained by biaxially stretching a saturated polyester such as polyethylene terephthalate (PET bottles) have excellent transparency, mechanical strength, heat resistance and gas barrier properties, and hence they have been widely used as containers for beverages such as juices, soft drinks and carbonated beverages.

For manufacturing bottles from such polyester, the polyester is generally injection molded into preforms which are then biaxially stretched by, for example, blow molding, to be shaped into bottles.

If acetaldehyde remains in the bottles thus obtained from the polyester, tastes of the contents filled in the bottles are markedly deteriorated. For this reason, the acetaldehyde content in the bottle-forming polyester is desired to be as low as possible. In order to reduce the amount of acetaldehyde contained in the bottle-forming polyester, it is required that the polyester not only has a low acetaldehyde content before molding but also hardly causes increase in acetaldehyde during molding.

Polyesters have conventionally been prepared by esterification reaction of a dicarboxylic acid such as terephthalic acid or its ester derivative and a diol such as ethylene glycol or its ester derivative and then polycondensation reaction of the resulting esterified products in the presence of a polycondensation catalyst. The polycondensation reaction comprises liquid phase and solid phase polycondensation steps, wherein a polyester from the liquid phase polycondensation step undergoes the solid phase polycondensation step to obtain a polyester having a high intrinsic viscosity and a low content of acetaldehyde.

Thus, conventional processes for preparing polyesters need both the liquid phase and solid phase polycondensation steps, the latter step taking a long period of time, whereby leading to increased production costs.

If a polyester obtained by liquid phase polycondensation without solid phase polycondensation is directly molded into an article such as a bottle, there is involved a problem that acetaldehyde is produced in the molding process, which may remain in the polyester molded article.

Accordingly, it has been desired to develop a process for preparing a polyester, in which a polyester having a low acetaldehyde content and hardly causing increase in acetaldehyde during molding into articles such as bottles can be prepared and the solid phase polycondensation step can be omitted.

OBJECT OF THE INVENTION

The present invention has been made in order to improve the prior art technique as mentioned above. An object of the invention is to provide a process for preparing a polyester, which can provide a polyester having a low acetaldehyde content as well as hardly causing increase in acetaldehyde during molding into articles such as bottles, and in which the solid phase polycondensation step can be omitted.

SUMMARY OF THE INVENTION

The first process for preparing a polyester according to the invention comprises:

[A] a liquid phase polycondensation step in which a dicarboxylic acid including terephthalic acid or its ester derivative and a diol including ethylene glycol or its derivative are subjected to polycondensation reaction in liquid phase and molten state under heating in the presence of a polycondensation catalyst to produce a polyester (a) having an intrinsic viscosity, as measured in o-chlorophenol, of 0.7 to 1.5 dl/g,

[C] a hot water treatment step in which the polyester (a) is contacted with hot water of 60° to 130° C. for 5 minutes to 10 hours,

[D-1] a drying step in which the polyester (c-1) having passed the hot water treatment step is dried at a temperature of 110° to 150° C. for 30 minutes to 6 hours, and

[D-2] a heat treatment step in which the polyester (c-1) having passed the drying step is heated at a temperature of 160° to 200° C. for 1 to 10 hours; wherein
the finally obtained polyester (d-1) has an acetaldehyde content of not more than 10 ppm.

In the first process for preparing a polyester according to the invention, the polyester (a) obtained in the liquid phase polycondensation step [A] may be subjected to [B] a precrystallization step in which the polyester (a) is kept in an atmosphere having a temperature of a heat-up crystallization temperature ($T_{C1}$) to 200° C. for 1 minute to 4 hours, prior to the hot water treatment step [C].

The polyester (a) obtained in the step [A] of the first process preferably has an intrinsic viscosity, as measured in o-chlorophenol, of 0.8 to 1.2 dl/g.

The second process for preparing a polyester according to the invention comprises:

[A] a liquid phase polycondensation step in which a dicarboxylic acid including terephthalic acid or its ester derivative and a diol including ethylene glycol or its ester derivative are subjected to polycondensation reaction in liquid phase and molten state under heating in the presence of a polycondensation catalyst to produce a polyester (a) having an intrinsic viscosity, as measured in o-chlorophenol, of 0.7 to 1.5 dl/g,

[B] a precrystallization step in which the polyester (a) is kept in an atmosphere having a temperature a heat-up crystallization temperature ($T_{C1}$) to 200° C. for 1 minute to 4 hours,

[D-2] a heat treatment step in which the polyester (b) having passed the precrystallization step is heated at a temperature of 160° to 200° C. for 1 to 10 hours, and

[C] a hot water treatment step in which the polyester (c-2) having passed the heat treatment step is contacted with hot water of 60° to 130° C. for 5 minutes to 10 hours; wherein
(i) the intrinsic viscosity of the polyester does not substantially increase in the steps [B] and [D-2], and
(ii) the finally obtained polyester (d-2) has an acetaldehyde content of not more than 10 ppm.

The polyester (a) obtained in the step [A] of the second process preferably has an intrinsic viscosity, as measured in o-chlorophenol, of 0.8 to 1.2 dl/g.

According to the first and second processes for preparing a polyester, the solid phase polycondensation step required in the conventional processes for preparing polyesters can be omitted. Moreover, a polyester having a low acetaldehyde content and hardly causing increase in acetaldehyde in the molding process can be prepared.

The polyester obtained by the processes of the invention is suitably used as a material for forming preforms and bottles for beverages.

DETAILED DESCRIPTION OF THE INVENTION

The first and second processes for preparing a polyester according to the invention will be described in detail hereinafter with reference to the processing flow charts shown in FIG. 1 and FIG. 2.

To begin with, the first process for preparing a polyester according to the invention is explained.

Figure 1:
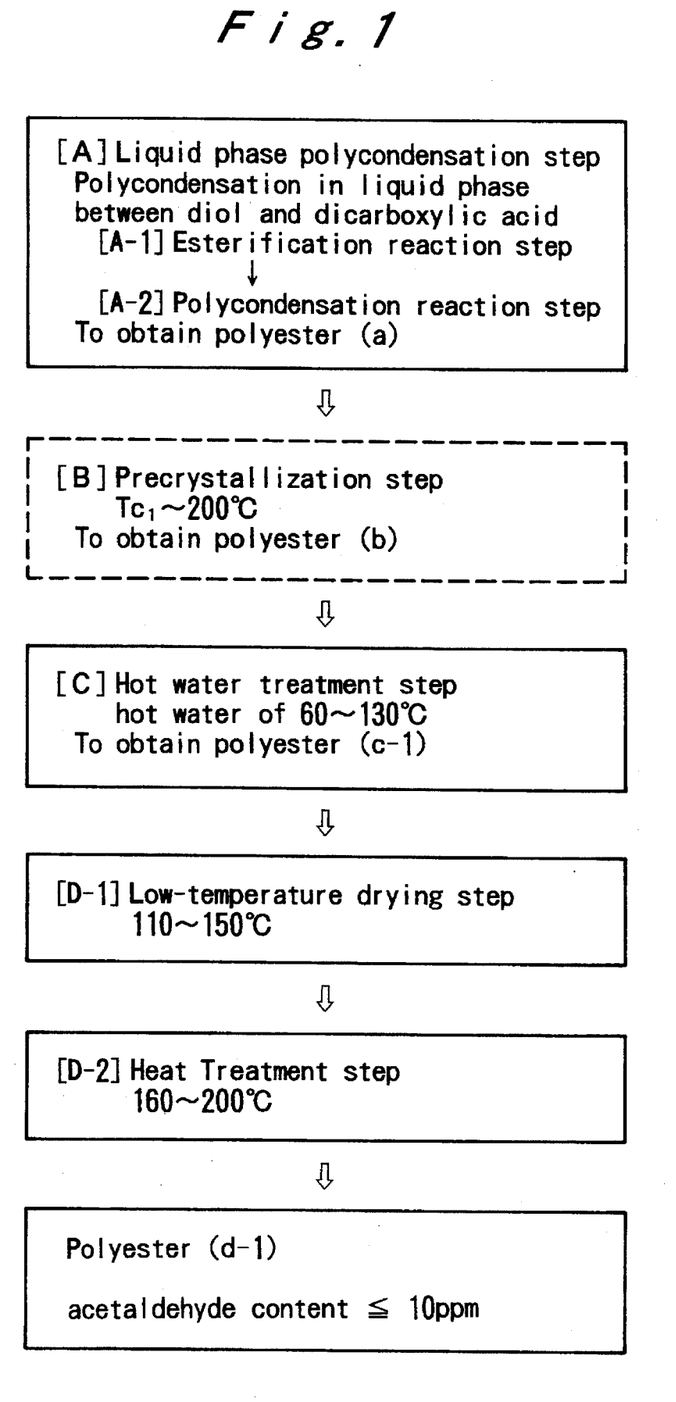
FIG. 1 is a flow chart of the first process for preparing a polyester according to the invention.

As shown in FIG. 1, the first process for preparing a polyester according to the invention comprises:

[A] a liquid phase polycondensation step in which a dicarboxylic acid including terephthalic acid or its ester derivative and a diol including ethylene glycol or its ester derivative are subjected to polycondensation reaction in liquid phase and molten state under heating in the presence of a polycondensation catalyst to produce a polyester (a) having an intrinsic viscosity, as measured in o-chlorophenol, of 0.7 to 1.5 dl/g,

[C] a hot water treatment step in which the polyester (a) is contacted with hot water of 60° to 130° C. for 5 minutes to 10 hours,

[D-1] a drying step in which the polyester (c-1) having passed the hot water treatment step is dried at a temperature of 110° to 150° C. for 30 minutes to 6 hours, and

[D-2] a heat treatment step in which the polyester (c-1) having passed the hot water treatment step is heated at a temperature of 160° to 200° C. for 1 to 10 hours; wherein the finally obtained polyester (d-1) has an acetaldehyde content of not more than 10 ppm.

In this invention, the polyester (a) obtained in the liquid phase polycondensation seep [A] may be subjected to [B] a precrystallization step in which the polyester (a) is kept in an atmosphere having a temperature of a heat-up crystallization temperature ($T_{C1}$) to 200° C. for 1 minute to 4 hours, prior to the hot water treatment step [C].

The steps of the above process are described below in more detail.

[A] Liquid phase polycondensation step

In the liquid phase polycondensation step according to the invention, the dicarboxylic acid including terephthalic acid or its ester derivative (e.g., a lower alkyl ester and a phenyl ester) and the diol including ethylene glycol or its ester derivative (e.g., a monocarboxylic ester) are subjected to polycondensation reaction in liquid phase and molten state under heating in the presence of a polycondensation catalyst to produce a polyester (a).

In the present invention, homopolyethylene terephthalate may be prepared by the use of terephthalic acid and ethylene glycol. Otherwise, a copolymerized polyester may be prepared by using, in addition to the terephthalic acid and ethylene glycol, other dicarboxylic acid than terephthalic acid (or its derivative) in an amount of not more than 20% by mol and/or other diol than ethylene glycol (or its derivative) in an amount of not more than 20% by mol.

Examples of other dicarboxylic acids than terephthalic acid used for preparing the copolymerized polyester include aromatic dicarboxylic acids such as phthalic acid (orthophthalic acid), isophthalic acid, naphthalenedicarboxylic acid, diphenyldicarboxylic acids and diphenoxyethanedicarboxylic acids; aliphatic dicarboxylic acids such as adipic acid, sebacic acid, azelaic acid and decanedicarboxylic acids; alicyclic dicarboxylic acids such as cyclohexanedicarboxylic acids; and ester derivatives thereof. They may be used in combination of two or more kinds.

Examples of other diols than ethylene glycol include aliphatic glycols such as trimethylene glycol (propylene glycol), tetramethylene glycol, neopentyl glycol, hexamethylene glycol, dodecamethylene glycol, diethylene glycol, triethylene glycol, tetraethylene glycol and polyethylene glycols; alicyclic glycols such as cyclohexanedimethanols; aromatic diols such as bisphenols, hydroquinone and 2,2-bis(4-β-hydroethoxyphenyl)propane; and ester derivatives thereof. They may be used in combination of two or more kinds.

In the present invention, polycarboxylic and polyhydric compounds such as trimesic acid, pyromellitic acid, trimethylolethane, trimethylolpropane, trimethylolmethane and pentaerythritol can also be used in small amounts, e.g., not more than 2% by mol.

The process of the invention may be carried out batchwise and continuously, and by way of example a continuous procedure will be described below.

The liquid phase polycondensation step [A] in which the dicarboxylic acid or its ester derivative (also referred to as "dicarboxylic acid") and the diol or its ester derivative (also referred to as "diol") are polycondensed to prepare a polyester, generally comprises an esterification reaction step [A-1] of the dicarboxylic acid and the diol and a subsequent liquid phase polycondensation reaction step [A-2].

More specifically, in the step [A], a slurry containing the dicarboxylic acid and the diol is first prepared. The slurry may contain the diol in an amount of 1.02 to 2.0 mol, preferably 1.03 to 1.5 mol, based on 1 mol of the dicarboxylic acid. The slurry is continuously fed to the esterification reaction step [A-1].

The esterification reaction is generally conducted in an apparatus comprising, for example, two esterification reactors in line connected under the conditions of refluxing the diol while removing water or alcohol produced by the reaction out of the system by means of a fractionating column.

When the esterification reaction step [A-1] is conducted in two stages as mentioned above, the esterification reaction of the first stage may be carried out at a temperature of usually 240° to 270° C., preferably 245° to 265° C., under a pressure of usually 0.2 to 3 kg/cm²-G, preferably 0.5 to 2 kg/cm²-G, and the esterification reaction of the second stage may be carried out at a temperature of usually 250° to 280° C. preferably 255° to 275° C., under a pressure of usually 0 to 1.5 kg/cm²-G, preferably 0 to 1.3 kg/Cm²-G.

Although there is no specific limitation on the esterification conversion in each stage, it is preferred that the conversion increases smoothly (gradually) from stage to stage and particularly reaches usually not less than 90%, preferably not less than 93% in the last stage.

Through the esterification reaction step [A-1], an esterified product (low condensate) having a number-average molecular weight of usually 500 to 5,000 is obtained.

The esterification reaction may be carried out without adding any substance other than the dicarboxylic acid and the diol, or in the presence of a polycondensation catalyst described later. It is also possible to carry out the reaction in the presence of a small amount of tertiary amines such as trimethylamine, tri-n-butylamine and benzyldimethylamine, quaternary ammoniums such as tetraethylammonium hydroxide, tetra-n-butylammonium hydroxide and trimethylbenzylammonium hydroxide, and basic compounds such as lithium carbonate, sodium carbonate, potassium carbonate and sodium acetate. These basic compounds may be added to all the esterification reactors or to any one or more reactors of the first to the last stages.

Subsequently, the esterified product thus obtained is continuously fed to the liquid phase polycondensation reactor where the polycondensation reaction is carried out at a temperature not lower than the melting point of the resulting polyester under a reduced pressure in the presence of a polycondensation catalyst while distilling off the produced glycol from the system.

In the present invention, the next step, the polycondensation reaction step [A-2], may be conducted either in one or more stages.

When the polycondensation reaction step [A-2] is conducted in plural stages, the polycondensation reaction of the first stage may be carried out at a temperature of usually 250° to 290° C., preferably 260° to 280° C. under a pressure of usually 500 to 20 Torr, preferably 200 to 30 Torr, and the polycondensation reaction of the last stage is carried out at a temperature of usually 265° to 300° C., preferably 270° to 295° C., under a pressure of usually 10 to 0.1 Torr, preferably 5 to 0.1 Torr, particularly preferably 2 to 0.1 Torr.

When the polycondensation reaction step [A-2] is conducted in three or more stages, the polycondensation reactions from the second stage to the last stage but one may be carried out under the conditions between those of the first and the last stages. For instance, in the polycondensation reaction step comprising three stages, the polycondensation reaction of the second stage may be carried out at a temperature of usually 260° to 295° C., preferably 270° to 285° C., under a pressure of usually 50 to 2 Torr, preferably 40 to 5 Torr.

Through the liquid phase polycondensation step [A] stated above, a polyester (a) having an intrinsic viscosity, as measured in o-chlorophenol at 25° C., of 0.7 to 1.5 dl/g, preferably 0.8 to 1.2 dl/g, is prepared. Although there is no specific limitation on the intrinsic viscosity of the polyester reached in each of the stages excluding the last stage in the polycondensation reaction step [A-2], it is preferred that the intrinsic viscosity increases smoothly and gradually from stage to stage.

For preparing the polyester (a) having the above-mentioned intrinsic viscosity in the liquid phase polycondensation step [A], the polycondensation reaction step [A-2] is desired to be carried out in three or more stages, preferably in three stages, and the polyester subjected to the polycondensation reaction of the last stage (the third stage) desirably has an intrinsic viscosity of 0.4 to 0.7 dl/g, preferably 0.5 to 0.65 dl/g.

Further, for obtaining the polyester (a) having the above-defined intrinsic viscosity by the multi-stage polycondensation reaction, conventionally known liquid phase polycondensation reactors can be used in combination. For instance, the first stage reaction can be carried out in a vertical reactor, the second stage reaction in a horizontal reactor equipped with a monoaxial stirrer and the third stage reaction in a horizontal reactor equipped with a biaxial stirrer. In this specification, the intrinsic viscosity is calculated from a solution viscosity of a polyester solution which is obtained by measuring at 25° C. on a cooled solution of 1.2 g of polyester heated and dissolved in 5 ml of o-chlorophenol.

The liquid phase polycondensation reaction is carried out in the presence of a catalyst.

Examples of the catalysts used herein include germanium compounds such as germanium dioxide, germanium tetraethoxide, germanium tetra-n-butoxide; antimony catalysts such as antimony trioxide and antimony acetate; and titanium catalysts such as titanium tetrabutoxide.

Of these catalysts, germanium dioxide is preferably employed because a polyester having good hue and high transparency can be obtained.

The polycondensation reaction is preferably carried out in the presence of a stabilizer. Examples of the stabilizers include phosphoric esters such as trimethyl phosphate, triethyl phosphate, tri-n-butyl phosphate, trioctyl phosphate, triphenyl phosphate and tricresyl phosphate; phosphorous esters such as triphenyl phosphite, tris(dodecyl) phosphite and tris(nonylphenyl) phosphite; acid phosphoric esters such as methyl acid phosphate, isopropyl acid phosphate, butyl acid phosphate, dibutyl phosphate, monobutyl phosphate and dioctyl phosphate; phosphorus compounds such as phosphoric acid and polyphosphoric acid.

The catalyst is desirably used in an amount of 0.0005 to 0.2% by weight, preferably 0.001 to 0.05% by weight, in terms of metal atom in the catalyst, based on the total weight of the dicarboxylic acid and the diol.

The stabilizer is desirably used in an amount of 0.001 to 0.1% by weight, preferably 0.002 to 0.02% by weight, in terms of phosphorus atom in the stabilizer, based on the total weight of the dicarboxylic acid and the diol.

These catalysts and stabilizers may be added in the esterification reaction step [A-1] or to the reactor of the first stage in the polycondensation reaction step [A-2].

The polyester (a) prepared in the last polycondensation reactor as described above is generally molded into particles (chips) by a melt extrusion molding method.

[B] Precrystallization step

In the present invention, the particulate polyester (a) obtained in the liquid phase polycondensation step may be subjected to a precrystallization step.

The precrystallization step is carried out by keeping the particulate polyester (a) in a dry state at a temperature of a heat-up crystallization temperature ($T_{C1}$) to 200° C., preferably at a temperature of $T_{C1}$ to 180° C., for 1 minute to 4 hours.

It is preferred that the precrystallization step is conducted in air or an inert atmosphere.

The polyester (b) after the precrystallization desirably has a crystallinity of 20 to 50%.

In this precrystallization step, so-called solid polycondensation reaction of polyester does not proceed, and therefore the intrinsic viscosity of the polyester (b) after the precrystallization is almost equal to that of the polyester (a) obtained in the liquid phase polycondensation step [A].

By subjecting the polyester to the precrystallization step as described above, the amount of acetaldehyde contained in the polyester can be decreased, and the polyester particles (chips) can be prevented from being fusion bonded with each other in the subsequent hot water treatment step or drying step.

[C] Hot water treatment step

In the first process for preparing a polyester according to the invention, the polyester (a) or the precrystallized polyester (b) is subjected to hot water treatment.

This hot water treatment is carried out by bringing the particulate polyester (a) or the particulate polyester (b) having passed the precrystallization step into contact with hot water, water vapor, water vapor-containing inert gas, water vapor-containing air or the like.

The contact between the particulate polyester (a) or (b) and hot water is desirably carried out by immersing the polyester in hot water heated to a temperature of usually 60° to 130° C., preferably 80° to 100° C., for usually 5 minutes to 10 hours, preferably 30 minutes to 5 hours.

When the particulate polyester (a) or (b) is brought into contact with water vapor, the contact therebetween may be carried out by feeding water vapor (or water vapor-containing inert gas or water vapor-containing air) of usually 60° to 130° C., preferably 80° to 100° C., in an amount of not less than 0.5 kg per 1 kg of the particulate polyester (a) or (b). The contact between the particulate polyester and water vapor is conducted for usually 5 minutes to 10 hours, preferably 1 to 8 hours.

The particulate polyester (c-1) obtained immediately after the hot water treatment generally has a water content of 5,000 to 10,000 ppm.

By subjecting the polyester (a) or (b) to the hot water treatment as described above, increase of acetaldehyde in the molding process can be inhibited.

The reason why increase of acetaldehyde in the molding process can be inhibited is presumed that the hot water treatment of polyester deactivates the polycondensation catalyst, e.g., germanium catalyst, contained in the polyester, whereby decomposition reaction or ester interchange reaction hardly proceeds even if the polyester is heated in the molding process, resulting in reduction of acetaldehyde produced.

[D-1] Low-temperature drying step

In the first process for preparing a polyester according to the invention, the polyester (c-1) having undergone the hot water treatment as described above is then subjected to low-temperature drying.

More specifically, the polyester (c-1) having undergone the hot water treatment is desirably dried at a temperature of 110° to 150° C., preferably 120° to 140° C., for 30 minutes to 6hours, preferably 1 to 4 hours.

The polyester (c-1) from which water is removed by the low-temperature drying as described above is preferred, because this polyester is prevented from being hydrolyzed.

[D-2] Heat treatment step

In the first process for preparing a polyester according to the invention, the polyester (c-1) obtained after the hot water treatment and the subsequent low-temperature drying is then heated at a high temperature.

More specifically, the polyester (c-1) is desirably heated at a temperature of 160° to 200° C., preferably 170° to 190° C., for 1 to 10 hours, preferably 2 to 6 hours. The heat treatment can be carried out by bringing the polyester (c-1) into contact with a flowing gas (e.g., air or nitrogen gas) heated to 160° to 200° C., preferably 170° to 190° C.

Through the heating under the above conditions, acetaldehyde contained in the polyester is removed, so that a polyester (d-1) having a reduced acetaldehyde content can be obtained.

In the heat treatment step [D-2], the polycondensation reaction of the polyester hardly proceeds, and the polyester (d-1) obtained after the heat treatment step has almost the equal intrinsic viscosity to that of the polyester (a) obtained in the liquid phase polycondensation step.

As described above, in the first process for preparing a polyester according to the invention, not only the precrystallization step [B], the low-temperature drying step [D-1] and the heat treatment step [D-2] are carried out at temperatures lower than those employed in the so-called solid phase polycondensation step, but also the catalyst is deactivated in the low-temperature drying step [D-1] and the heat treatment step [D-2]. Therefore, the polycondensation reaction does not substantially proceed in these steps so that the intrinsic viscosity of the polyester does not substantially increase, and also the acetoaldehyde content of the resulting polyester can be reduced effectively.

The polyester (d-1) prepared by the first process of the invention has (i) an acetaldehyde content of not more than 10 ppm, preferably not more than 5 ppm, and (ii) an intrinsic viscosity, as measured in o-chlorophenol, of usually 0.7 to 1.5 dl/g, preferably 0.8 to 1.1 dl/g, particularly preferably 0.8 to 1.0 dl/g.

Further, the polyester (d-1) prepared by the first process of the invention desirably has a crystallinity of 30 to 50%.

As described above, the polyester (d-1) obtained by the first process of the invention has not only the low acetaldehyde content, but also reduced tendency to increase acetaldehyde in the molding process. For instance, a molded article such as a preform obtained from the polyester (d-1) by injection molding hereof at a molding temperature of 270° to 310° C., e.g., 290° C., has an acetaldehyde content of usually not more than 20 ppm, preferably not more than 15 ppm.

Next, the second process for preparing a polyester according to the invention is explained.

Figure 2:
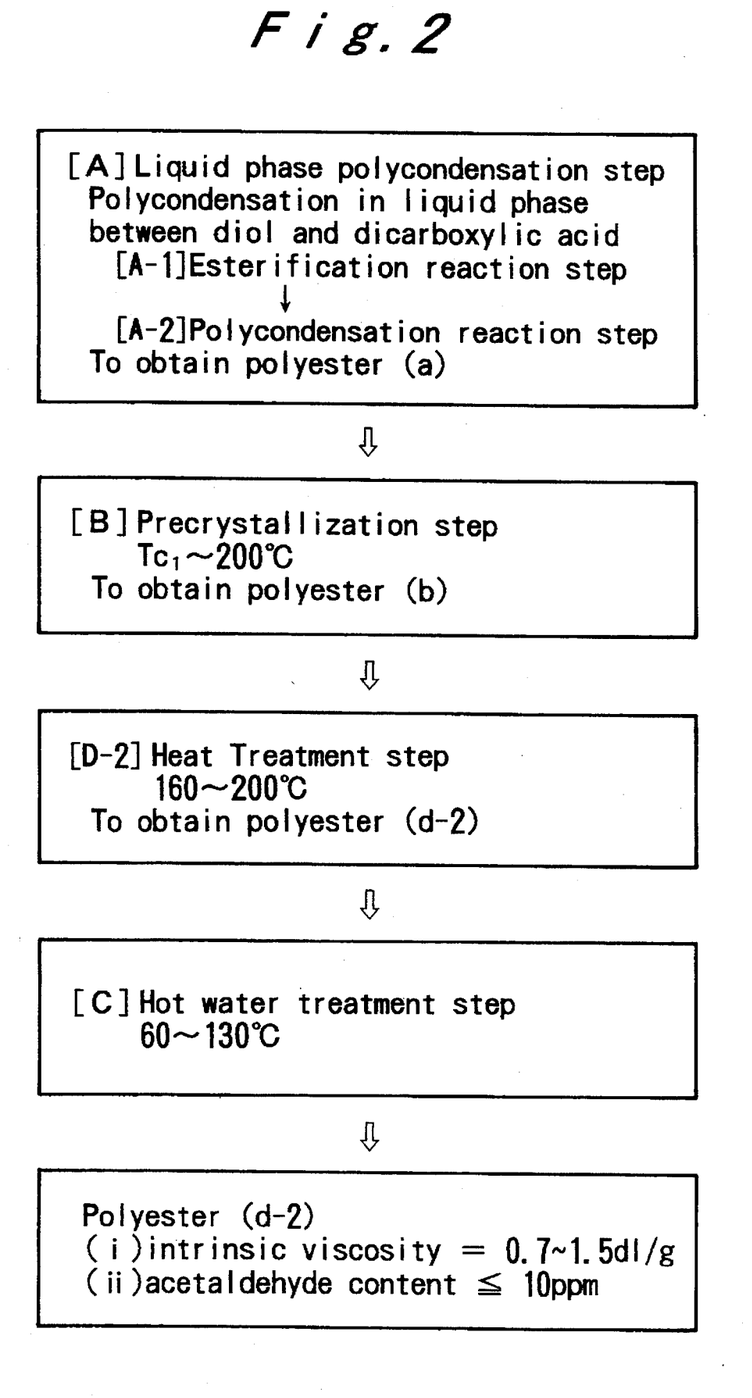
FIG. 2 is a flow chart of the second process for preparing a polyester according to the invention.

As shown in FIG. 2, the second process for preparing a polyester according to the invention comprises:

[A] a liquid phase polycondensation step in which a dicarboxylic acid including terephthalic acid or its ester derivative and a diol including ethylene glycol or its ester derivative are subjected to polycondensation reaction in liquid phase and molten state under heating in the presence of a polycondensation catalyst to produce a polyester (a) having an intrinsic viscosity, as measured in o-chlorophenol, of 0.7 to 1.5 dl/g,

[B] a precrystallization step in which the polyester (a) is kept in an atmosphere having a temperature a heat-up crystallization temperature ($T_{c1}$) to 200° C. for 1 minute to 4 hours,

[D-2] a heat treatment step in which the polyester (b) having passed the precrystallization step is heated at a temperature of not lower than 160° to 200° C. for 1 to 10 hours, and

[C] a hot water treatment step in which the polyester (c-2) having passed the heat treatment step is contacted with hot water of 60° to 130° C. for 5 minutes to 10 hours;

wherein
(i) the intrinsic viscosity of the polyester does not substantially increase in the steps [B] and [D-2], and
(ii) the finally obtained polyester (d-2) has an acetaldehyde content of not more than 10 ppm.

In the second process for preparing a polyester according to the invention, the liquid phase polycondensation step [A] and the precrystallization step [B] can be conducted under those conditions described for the corresponding steps in the first process of the invention, respectively.

In the second process for preparing a polyester according to the invention, the polyester (b) having been precrystallized as above is subjected firstly to the heat treatment step [D-2] and then the hot water treatment step [c].

The heat treatment [D-2] and the hot water treatment [C] in the second process of the invention can also be conducted under those conditions described for the corresponding steps in the first process of the invention, respectively.

It can be seen from the comparison between the first and second processes of the invention that in the second process, the low-temperature drying step [D-1] in the first process can be omitted (but preferably be carried out), and the steps after the precrystallization step [B] are carried out in different order in the first process. However, the polyester (d-2) obtained by the second process has also excellent properties, i.e., a low acetaldehyde content as well as reduced tendency to increase of acetaldehyde in the molding process.

In the heat treatment step [D-2], the polycondensation reaction of the polyester also hardly proceeds, and the polyester (c-2) obtained after the heat treatment step has almost the equal intrinsic viscosity to that of the polyester (a) obtained in the liquid phase polycondensation step.

The particulate polyester obtained immediately after the hot water treatment [C] generally has a water content of 5,000 to 10,000 ppm.

By subjecting the polyester (c-2) to the hot water treatment as described above, increase of acetaldehyde in the molding process can be inhibited.

The reason why increase of acetaldehyde in the molding process can be inhibited is presumed that the hot water treatment of polyester deactivates the polycondensation catalyst, e.g., germanium catalyst, contained in the polyester, whereby decomposition reaction or ester interchange reaction hardly proceeds even if the polyester is heated in the molding process, resulting in reduction of acetaldehyde produced.

The polyester (d-2) having been treated with hot water as described above is then preferably subjected to low-temperature drying. More specifically, the polyester is desirably dried at a temperature of 110° to 150° C., preferably 120 to 140° C., for 30 minutes to 6 hours, preferably 1 to 4 hours.

The polyester (d-2) from which water is removed by the low-temperature drying as described above is preferred, because this polyester is prevented from being hydrolyzed.

In the second process for preparing a polyester according to the invention, the precrystallization step [B] and the heat treatment step [D-2] are carried out at temperatures lower than those employed in the so-called solid phase polycondensation step, so that in these steps the polycondensation reaction does not substantially proceed and the intrinsic viscosity of the polyester does not substantially increase.

The polyester (d-2) prepared by the second process of the invention has
(i) an intrinsic viscosity, as measured in o-chlorophenol, of 0.7 to 1.5 dl/g, preferably 0.8 to 1.1 dl/g, particularly preferably 0.8 to 1.0 dl/g, and
(ii) an acetaldehyde content of not more than 10 ppm, preferably not more than 5 ppm.

Further, the polyester (d-2) prepared by the second process of the invention desirably has a crystallinity of 30 to 50%.

As described above, the polyester (d-2) obtained by the second process of the invention has not only the low acetaldehyde content, but also reduced tendency to increase acetaldehyde in the molding process. For instance, a molded article such as a preform obtained from the polyester (d-2) by injection molding thereof at a molding temperature of 270° to 310° C., e.g., 290° C., has an acetaldehyde content of usually not more than 20 ppm, preferably not more than 15 ppm.

The polyesters prepared by the first and second processes of the invention can be used for any purpose of conventionally known polyesters, and are particularly suited for manufacturing hollow molded articles. For example, these polyesters can be fed to a molding machine such as an injection molding machine to form preforms for hollow articles which is then placed in a mold of predetermined shape and blow molded into hollow containers. The hollow containers thus obtained hardly alter the tastes of the contents.

The polyesters prepared according to the invention can be suitably used as a material for forming preforms for beverage bottles.

EFFECT OF THE INVENTION

The polyesters obtained by the processes according to the invention have not only a low acetaldehyde content, but also tendency to hardly increase amount of acetaldehyde produced in the molding process. Therefore, hollow containers such as bottles manufactured from the polyesters do not alter the tastes of the contents.

Further, the processes for preparing polyesters according to the invention do not need a solid phase polycondensation step, so that the processes have the advantages of productivity and economy.

The polyesters according to the invention can be suitably used as a material for forming preforms for beverage bottles.

EXAMPLE

The present invention will be further described with reference to the following examples, but it should be construed that the invention is in no way limited to those examples.

Figure 3:
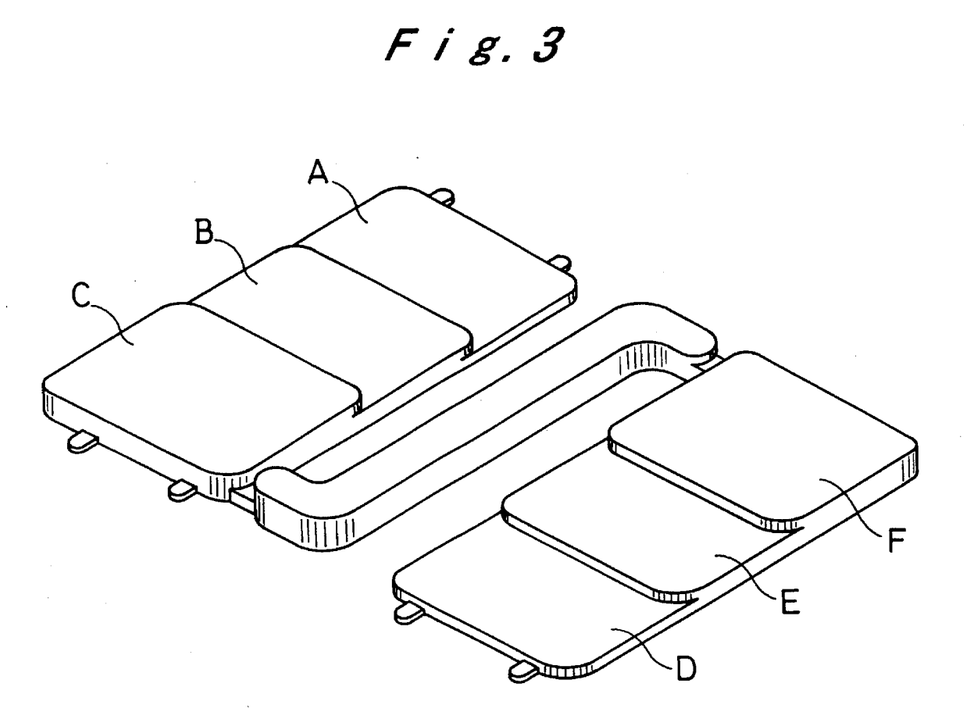
FIG. 3 is a perspective view of a stepped square plate formed in the Examples.

In this specification, acetaldehyde content or concentration (ppm) is measured with respect to a stepped square plate molded article as shown in FIG. 3, which is obtained by injection molding of polyester chips in the manner described below.

The stepped square plate in FIG. 3 comprises six parts A to F wherein the part A is 2 mm in thick, the part B is 4 mm, the part C is 6 mm, the part D is 3 mm, the part E is 5 mm and the part F is 7 mm. The acetaldehyde concentration is measured on the part E of the stepped square plate.

Preparation of stepped square plate 2 kg of dried polyester chips are injection molded into a stepped square plate as shown in FIG. 3 by means of an injection molding machine of M-70A produced by Meiki Seisakusho K. K., in which nitrogen having a dew point of −70° C. is fed to an upper part of a hopper and to a screw feeder shooting part at a rate of 5 Nm³/hr, respectively; at a barrel temperature of 290° C.; at C1, C2, C3 and nozzle tip temperatures of 260° C., 280° C. 280° C. and 300° C., respectively; and at a mold-cooling temperature of 15° C.

The injection molding to obtain the stepped square plate is carried out by feeding the dried polyester chips to the injection molding machine in such a manner that the metering time and the injection time are 12 seconds and 60 seconds, respectively. The residence time of the molten resin in the molding machine is about 72 seconds. The weight of one stepped square plate is about 75 g.

Measurement of acetaldehyde concentration

The acetaldehyde concentration of the stepped square plate molded article was determined as follows. A sample from the part E of the stepped square plate was pulverized by a freezer mill, then acetaldehyde contained in the sample is extracted with hot water, and the acetaldehyde is quantitatively determined by means of gas chromatography in accordance with an internal standard method.

Measurement of heat-Up crystallization temperature

The heat-up crystallization temperature ($T_{C1}$) of the polyester is measured as follows. The polyester chips are dried at about 140° C. under a pressure of about 5 mmHg for about 5 hours or more, and about 10 mmg of a thin piece as a sample is taken out from the central part of the polyester chips and potted into an aluminum pan for liquid under a nitrogen atmosphere. The measurement is conducted using DSC-2 type differential scanning calorimeter available from Perkin Elmer Co. under the conditions such that the sample is first heated rapidly from room temperature to 290° C., at which temperature the sample is kept at molten state for 10 minutes and then cooled rapidly to room temperature, and thereafter the top temperature of an exothermal peak detected at the time of elevating the temperature at a heat-up rate of 10° C./min is obtained.

Measurement of intrinsic viscosity

The intrinsic viscosity (dl/g) of the polyester is determined as follows. A sample is heated and dissolved in o-chlorophenol (OCP), and a solution viscosity is measured by a capillary viscometer. From the value of solution viscosity and an empirical formula preliminary prepared, the intrinsic viscosity is determined.

Example 1

To 100 parts by weight of terephthalic acid were added 50.5 parts by weight of ethylene glycol and 0.026 part by weight of germanium dioxide to perform esterification reaction in a conventional manner. When the reaction was completed, the solution temperature was 240° C. Then, to the reaction mixture was added 0.030 part by weight of trimethyl phosphate to perform polycondensation reaction in three stages. In the last stage, the polycondensation reaction was carried out at a temperature of 270° C. under a pressure of 1 Torr, to obtain a polyester having an intrinsic viscosity of 0.84 dl/g. The polyester chips had an acetaldehyde concentration of 90 ppm and a heat-up crystallization temperature of 164.8° C.

Subsequently, the polyester chips were precrystallized at 170° C for 2 hours in a stream of nitrogen. After completion of the precrystallization, the polyester chips had an intrinsic viscosity of 0.83 dl/g and an acetaldehyde concentration of 22 ppm. Thereafter, the polyester chips were immersed in hot water at 95° C. for 4 hours, and then subjected to low-temperature drying at 130° C. for 2 hours in a stream of nitrogen, followed by heating at 180° C. for 2 hours. The intrinsic viscosity, acetaldehyde concentration and water content of the polyester chips obtained in each of the steps are shown in Table 1.

TABLE 1

| | Polyester chips after | | | | |
|---|---|---|---|---|---|
| | [A] (a) | [B] (b) | [C] (c-1) | [D-1] | [D-2] (d-1) |
| Intrinsic viscosity (dl/g) | 0.84 | 0.83 | 0.80 | 0.80 | 0.79 |
| $CH_3CHO$ (ppm) | 90 | 22 | 21 | 17 | 4.5 |
| Water (ppm) | — | — | 8,500 | 300 | 50 |

[A]: Polycondensation
[B]: Precrystallization
[C]: Hot-water treatment
[D-1]: Low-temperature drying
[D-2]: Heat treatment The polyester chips (d-1) were further dried at 160° for 3 hours in a stream of nitrogen to reduce the water content in the chips to 20 ppm. The thus-dried chips had an intrinsic viscosity of 0.79 dl/g and an acetaldehyde concentration of 3.6 ppm. Then, the chips were melted under heating at 290° C. and molded into a stepped square plate molded article as shown in FIG. 3. The molded article had an acetaldehyde concentration of 15 ppm.

Separately, the chips were molded into a preform by means of a molding machine of M-100A produced by Meiki Seisakusho K. K. under the conditions of a molding temperature of 270° C., a nozzle temperature of 310° C. and a mold temperature of 10° C. The preform had an acetaldehyde concentration of 10 ppm.

Comparative Example 1

The polyester chips (a) as obtained in Example 1 were precrystallized at 170° C. for 2 hours in a stream of nitrogen, and then subjected to low-temperature drying at 130° C. for 2 hours, followed by heating at 180° C. for 2 hours. The polyester chips obtained after these treatments had an intrinsic viscosity of 0.80 dl/g and an acetaldehyde concentration of 4.4 ppm. After drying at 160° C. for 3 hours, the chips were molded into a stepped square plate molded article as in Example 1. The molded article had an acetaldehyde concentration of 30 ppm.

Further, a preform prepared from the chips in the same manner as in Example 1 had an acetaldehyde concentration of 25 ppm.

Example 2

The polyester chips (a) as obtained in Example 1 were treated in the same manner as in Example 1 except that the precrystallization was omitted and the heat treatment was carried out at 170° C. for 4 hours. The intrinsic viscosity, acetaldehyde concentration and water content of the polyester chips obtained in each of the steps are shown in Table 2.

TABLE 2

|  | Polyester chips after | | | |
|---|---|---|---|---|
|  | [A] (a) | [C] (c-1) | [D-1] | [D-2] (d-1) |
| Intrinsic viscosity (dl/g) | 0.84 | 0.81 | 0.81 | 0.80 |
| CH₃CHO (ppm) | 90 | 75 | 64 | 6.8 |
| Water (ppm) | — | 12,000 | 340 | 70 |

[A]: Polycondensation
[C]: Hot-water treatment
[D-1]: Low-temperature drying
[D-2]: Heat treatment Further, after drying at 160° C. for 3 hours, the chips (d-1) were molded into a stepped square plate molded article as in Example 1. The molded article had an acetaldehyde concentration of 17 ppm. Furthermore, a preform prepared from the chips in the same manner as in Example 1 had an acetaldehyde concentration of 11 ppm.

Example 3

To 100 parts by weight of terephthalic acid were added 46.8 parts by weight of ethylene glycol and 0.031 part by weight of germanium dioxide to perform esterification reaction in a conventional manner. When the reaction was completed, the solution temperature was 240° C. Then, to the reaction mixture was added 0.030 part by weight of trimethyl phosphate to perform polycondensation reaction in three stages. In the last stage, the polycondensation reaction was carried out at a temperature of 270° C. under a pressure of 1 Torr, to obtain a polyester having an intrinsic viscosity of 0.83 dl/g. The polyester chips had an acetaldehyde concentration of 53 ppm and a heat-up crystallization temperature of 159.0° C.

Subsequently, the polyester chips were precrystallized at 170° C. for 2 hours in a stream of nitrogen, then heated at 180° C. for 3 hours and immersed in for 3 hours. Thereafter, the chips were subjected to low-temperature drying at 130° C. for 2 hours. The intrinsic viscosity, acetaldehyde concentration and water content of the polyester chips obtained in each of the steps are set forth in Table 3.

TABLE 3

|  | Polyester chips after | | | | |
|---|---|---|---|---|---|
|  | [A] (a) | [B] (b) | [D-2] (c-2) | [C] (d-2) | Low-temp. drying |
| Intrinsic viscosity (dl/g) | 0.83 | 0.82 | 0.82 | 0.82 | 0.81 |
| CH₃CHO (ppm) | 53 | 11 | 2.5 | 2.2 | 2.2 |
| Water (ppm) | — | — | 40 | 6000 | 300 |

[A]: Polycondensation
[B]: Precrystallization
[D-2]: Heat treatment
[C]: Hot-water treatment The polyester chips (d-2) having been subjected to the low-temperature drying were further dried at 160° C. for 3 hours in a stream of nitrogen to reduce the water content in the chips to 40 ppm. The thus-dried chips had an intrinsic viscosity of 0.81 dl/g and an acetaldehyde concentration of 1.7 ppm. Thereafter, the chips were molded into a stepped square plate molded article as in Example 1. The molded article had an acetaldehyde concentration of 12 ppm.

Further, a preform prepared from the chips in the same manner as in Example 1 had an acetaldehyde concentration of 8 ppm.

Comparative Example 2

The polyester chips (a) as obtained in Example 3 were precrystallized at 170° C. for 2 hours in a stream of nitrogen, and then heated at 180° C. for 3 hours, followed by low-temperature drying at 130° C. for 2 hours. The polyester chips obtained after these treatments had an intrinsic viscosity of 0.82 dl/g and an acetaldehyde concentration of 1.5 ppm. After drying at 160° C. for 3 hours, the chips were molded into a stepped square plate molded article as in Example 1. The molded article had an acetaldehyde concentration of 27 ppm.

Further, a preform prepared in the same manner as in Example 1 had an acetaldehyde concentration of 26 ppm.

Example 4

The polyester chips (a) as obtained in Example 3 were treated in the same manner as in Example 3 except that the heat treatment was carried out at 170° C. for 4 hours. The intrinsic viscosity, acetaldehyde concentration and water content of the polyester chips obtained in each of the steps are shown in Table 4.

TABLE 4

|  | Polyester chips after | | | | |
|---|---|---|---|---|---|
|  | [A] (a) | [B] (b) | [D-2] (c-2) | [C] (d-2) | Low-temp. drying |
| Intrinsic viscosity (dl/g) | 0.83 | 0.82 | 0.81 | 0.81 | 0.80 |
| CH₃CHO (ppm) | 53 | 11 | 3.0 | 3.0 | 2.5 |
| Water (ppm) | — | — | 180 | 7500 | 600 |

[A]: Polycondensation
[B]: Precrystallization
[D-2]: Heat treatment
[C]: Hot-water treatment The polyester chips (d-2) having been subjected to the low-temperature drying were further dried at 160° C. for 3 hours, and were molded into a stepped square plate molded article as in Example 1. The molded article had an acetaldehyde concentration of 13 ppm. Further, a preform prepared in the same manner as in Example 1 had an acetaldehyde concentration of 9 ppm.

What is claimed is:

1. A process for preparing a polyester consisting essentially of:

(A) a liquid phase polycondensation step in which a dicarboxylic acid compound selected from the group consisting of terephthalic acid, its lower alkyl ester and its phenyl ester and a diol compound selected from the group consisting of ethylene glycol and its monocarboxylic ester are subjected to polycondensation reaction in liquid phase under heating in the presence of a polycondensation catalyst to produce a polyester (a) having an intrinsic viscosity, as measured in o-chlorophenol, of 0.7 to 1.5 dl/g, (C) a hot water treatment step in which the polyester (a) is contacted with hot water of 60° to 130° C. for 5 minutes to 10 hours, (D-1) a drying step in which the polyester (c-1) having passed the hot water treatment step is dried at a temperature of 110° to 150° C. for 30 minutes to 6 hours, and (D-2) a heat treatment step in which the polyester (c-1) having passed the drying step is heated at a temperature of 160° to 200° C. for 1 to 10 hours; wherein the finally obtained polyester (d-2) has an acetaldehyde content of not more than 10 ppm.

2. A process for preparing a polyester consisting essentially of:

(A) a liquid phase polycondensation step in which a dicarboxylic acid compound selected from the group consisting of terephthalic acid, its lower alkyl ester and its phenyl ester and a diol compound selected from the group consisting of ehylene glycol and its monocarboxylic ester are subjected to polycondensation reaction in liquid phase under heating in the presence of a polycondensation catalyst to produce a polyester (a) having an intrinsic viscosity, as measured in o-chlorophenol, of 0.7 to 1.5 dl/g, (B) a precrystallization step in which the polyester (a) is kept in an atmosphere having a temperature of a heat-up crystallization temperature ($T_{c-1}$) to 200° C. for 1 minute to 4 hours, (C) a hot water treatment step in which the polyester (b) having passed the precrystallization step is contacted with hot water of 60° to 130° C. for 5 minutes to 10 hours, (D-1) a drying step in which the polyester (c-1) having passed the hot water treatment step is dried at a temperature of 110° to 150° C. for 30 minutes to 6 hours, and (D-2) a heat treatment step in which the polyester (c-1) having passed the drying step is heated at a temperature of 160° to 200° C. for 1 to 10 hours; wherein the finally obtained polyester [(d-1)] (d-2) has an acetaldehyde content of not more than 10 ppm.

3. The process for preparing a polyester as claimed in claim 1 or 2, wherein the polyester (a) obtained in the liquid phase polycondensation step [A] has an intrinsic viscosity, as measured in o-chlorophenol, of 0.8 to 1.2 dl/g.

4. The process for preparing a polyester as claimed in claim 1 or 2, wherein the liquid phase polycondensation step [A] consists of an esterification reaction step [A-1] and a polycondensation reaction step [A-2], and the polycondensation reaction step [A-2] comprises polycondensation reactions of three or more stages.

5. The process for preparing a polyester as claimed in claim 4, wherein the polyester obtained after the polycondensation reaction of the second stage in the polycondensation reaction step [A-2] has an intrinsic viscosity of 0.4 to 0.7 dl/g.

6. The process for preparing a polyester as claimed in claim 2, wherein the precrystallized polyester (b) obtained in the precrystallization step [B] has a crystallinity of 20 to 50%.

7. The process for preparing a polyester as claimed in claim 1 or 2, wherein the polyester (d-1) has a crystallinity of 30 to 50%.

8. The process for preparing a polyester as claimed in claim 1 or 2, wherein the polyester (d-1) has an acetaldehyde content of not more than 5 ppm.

9. A process for preparing a polyester consisting essentially of:

(A) a liquid phase polycondensation step in which a dicarboxylic acid compound selected from terephthalic acid, its lower alkyl ester and its phenyl ester and a diol, compound selected from ethylene glycol and its monocarboxylic ester are subjected to polycondensation reaction in liquid phase under heating in the presence of a polycondensation catalyst to produce a polyester (a) having an intrinsic viscosity, as measured in o-chlorophenol, of 0.7 to 1.5 dl/g, (B) a precrystallization step in which the polyester (a) is kept in an atmosphere having a temperature of a heat-up crystallization temperature ($T_{C1}$) to 200° C. for 1 minute to 4 hours, (D-1) a heat treatment step in which the polyester (b) having passed the precrystallization step is heated at a temperature of 160° to 200° C. for 1 to 10 hours, and (C) a hot water treatment step in which the polyester (c-2) having passed the heat treatment step is contacted with hot water of 60° to 130° C. for 5 minutes to 10 hours; wherein (i) the intrinsic viscosity of the polyester does not substantially increase in the steps (B) and (D-2), and (ii) the finally obtained polyester (d-2) has an acetaldehyde content of not more than 10 ppm.

10. The process for preparing a polyester as claimed in claim 9, wherein the polyester (a) obtained in the liquid phase polycondensation step [A] has an intrinsic viscosity, as measured in o-chlorophenol, of 0.8 to 1.2 dl/g.

11. The process for preparing a polyester as claimed in claim 9, wherein the liquid phase polycondensation step [A] consists of an esterification reaction step [A-1] and a polycondensation reaction step [A-2], and this polycondensation reaction step [A-2] comprises polycondensation reactions of three or more stages.

12. The process for preparing a polyester as claimed in claim 11, wherein the polyester subjected to the polycondensation reaction of the last stage in the polycondensation reaction step [A-2] has an intrinsic viscosity of 0.4 to 0.7 dl/g.

13. The process for preparing a polyester as claimed in claim 9, wherein the precrystallized polyester (b) obtained in the precrystallization step [B] has a crystallinity of 20 to 50%.

14. The process for preparing a polyester as claimed in claim 9, wherein the polyester (d-2) has a crystallinity of 30 to 50%.

15. The process for preparing a polyester as claimed in claim 9, wherein the polyester (d-2) has an acetaldehyde content of not more than 5 ppm.

16. A beverage bottle formed from the polyester prepared by the process as claimed in claim 1, 2 or 9.

17. The beverage bottle as claimed in claim 16, wherein said bottle has an acetaldehyde content of not more than 20 ppm.

18. A process for preparing a polyester consisting essentially of:

(A) a liquid phase polycondensation step in which a terephthalic acid and an ethylene glycol are subjected to polycondensation reaction in liquid phase under heating in the presence of a polycondensation catalyst to produce a polyester (a) having an intrinsic viscosity, as measured in o-chlorophenol, of 0.7 to 1.5 dl/g, (C) a hot water treatment step in which the polyester (a) is contacted with hot water of 60° to 130° C. for 5 minutes to 10 hours, (D-1) a drying step in which the polyester (c-1) having passed the hot water treatment step is dried at a temperature of 100° to 150° C. for 30 minutes to 6 hours, and (D-2) a heat treatment step in which the polyester (c-1) having passed the drying step is heated at a temperature of 160 to 200° C. for 1 to 10 hours; wherein the finally obtained polyester (d-2) has an acetaldehyde content of not more than 10 ppm.

19. A process for preparing a polyester comprising:

(A) a liquid phase polycondensation step in which a terephthalic acid and an ethylene glycol are subjected to polycondensation reaction in liquid phase under heating in the presence of polycondensation catalyst to produce a polyester (a) having an intrinsic viscosity, as measured in o-chlorophenol, of 0.7 to 1.5 dl/g, (B) a precrystallization step in which the polyester (a) is kept in an atmosphere having a temperature of a heat-up crystallization temperature ($T_{C1}$) to 200° C. for 1 minute to 4 hours, (C) a hot water treatment step in which the polyester (b) having passed the precrystallization step is contacted with hot water of 60° to 130° C. for 5 minutes to 10 hours, (D-1) a drying step in which the polyester (c-1) having passed the hot water treatment step is dried at a temperature of 110° to 150° C. for 30 minutes to 6 hours, and (D-2) a heat treatment step in which a polyester (c-1) having passed the drying step is heated at a temperature of 160° to 200° C. for 1 to 10 hours; wherein the finally obtained polyester (d-2) has an acetaldehyde content of not more than 10 ppm.

20. The process for preparing a polyester as claimed in claim 18 or 19, wherein the liquid phase polycondensation step (A) consists of an esterification reaction step (A-1) and a polycondensation reaction step (A-2), and the polycondensation reaction step (A-2) comprises polycondensation reactions of three or more stages.

21. The process for preparing a polyester as claimed in claim 18 or 19, wherein the polyester (d-1) has a crystallinity of 30 to 50%.

22. A process for preparing a polyester consisting essentially of:

(A) a liquid phase polycondensation step in which a terephthalic acid and an ethylene glycol are subjected to polycondensation reaction in liquid phase under heating in the presence of a polycondensation catalyst to produce a polyester (a) having an intrinsic viscosity, as measured in o-chlorophenol, of 0.7 to 1.5 dl/g, (B) a precrystallization step in which the polyester (a) is kept in an atmosphere having a temperature of a heat-up crystallization temperature ($T_{C1}$) to 200° C. for 1 minute to 4 hours, (D-2) a heat treatment step in which the polyester (b) having passed the precrystallization step is heated at a temperature of 160° to 200° C. for 1 to 10 hours, and (C) a hot water treatment step in which the polyester (c-2) having passed the heat treatment step is contacted with hot water of 60° to 130° C. for 5 minutes to 10 hours; wherein (i) the intrinsic viscosity of the polyester does not substantially increase in the steps (B) and (D-2), and (ii) the finally obtained polyester (d-2) has an acetaldehyde content of not more than 10 ppm.

23. The process for preparing a polyester as claimed in claim 22, wherein the liquid phase polycondensation step (A) consists of an esterification reaction step (A-1) and a polycondensation reaction step (A-2), and this polycondensation reaction step (A-2) comprises polycondensation reactions of three or more stages.

24. The process for preparing a polyester as claimed in claim 22, wherein the polyester (d-2) has a crystallinity of 30 to 50%.

* * * * *